(12) United States Patent
Viggiano et al.

(10) Patent No.: US 8,066,439 B2
(45) Date of Patent: Nov. 29, 2011

(54) CAMERA ELEVATOR DOLLY

(76) Inventors: Justin E. Viggiano, Westmont, NJ (US);
James H. Viggiano, Westmont, NJ (US);
Agostino Viggiano, Westmont, NJ (US)

( * ) Notice: Subject to any disclaimer, the term of this patent is extended or adjusted under 35 U.S.C. 154(b) by 0 days.

(21) Appl. No.: 12/802,168

(22) Filed: Jun. 2, 2010

(65) Prior Publication Data

US 2011/0008037 A1 Jan. 13, 2011

Related U.S. Application Data

(60) Provisional application No. 61/270,293, filed on Jul. 7, 2009.

(51) Int. Cl.
*G03B 17/00* (2006.01)
*H04N 5/225* (2006.01)

(52) U.S. Cl. ......... 396/428; 396/422; 348/375; 352/243

(58) Field of Classification Search .................. 396/428, 396/419, 422; 348/373–375; 352/243
See application file for complete search history.

(56) References Cited

U.S. PATENT DOCUMENTS 3,613,546 A * 10/1971 Richardson .................. 396/428
* cited by examiner

*Primary Examiner* — Rochelle-Ann J Blackman
(74) *Attorney, Agent, or Firm* — Kenneth R. Rice

(57) ABSTRACT

A camera dolly has a base on which an elevator is mounted. The elevator has a sliding shelf for mounting a camera, a counterweight to balance the weight of the camera. A fixed shelf is provided to hold accessories such as a video monitor. The base is provided with removable wheels for use on most surfaces. The base also has rollers which move along a track made of PVC pipe or hoses filled with compressed air. An alternative embodiment has the camera mounted to a sliding mount connected to the base. A tripod may also be mounted on the base.

9 Claims, 7 Drawing Sheets

CAMERA ELEVATOR DOLLY

CLAIM OF PRIORITY

This application claims priority to provisional patent application 61/270,293 filed Jul. 7, 2009.

BACKGROUND OF THE INVENTION

This invention relates, in general, to a camera dolly, and, in particular, to an improved arrangement for providing a way to move a camera in multiple directions while filming a scene. Movie making involves acting out scenes in front of a camera. While a static camera is adequate for some scenes, many times it is desirable to have a camera move though a movie set to achieve a more dynamic view of the scenes being filmed. Camera movement can be side to side, up and down, and toward or away from a scene, and combinations of those directions to provide for all manner of diagonal movement.

SUMMARY OF THE INVENTION

The present invention is directed to a camera dolly which allows the camera to be moved in multiple orthogonal and non-orthogonal directions when in use.

It is an object of the present invention to provide a new and improved camera dolly that may be moved on wheels or on a configurable track.

It is an object of the present invention to provide a new and improved camera dolly which provides manual leveling, multiple fixed angle camera positions and manual tilt positions.

It is an object of the present invention to provide a new and improved camera dolly which may be easily disassembled to allow for transport.

It is an object of the present invention to provide a new and improved camera dolly which may be easily converted for use with a conventional camera tripod.

These and other objects and advantages of the present invention will be fully apparent from the following description, when taken in connection with the annexed drawings.

DESCRIPTION OF THE PREFERRED EMBODIMENT

The preferred embodiment herein described is not intended to be exhaustive or to limit the invention to the precise form disclosed. It is chosen and described to best explain the invention so that others, skilled in the art to which the invention pertains, might utilize its teachings.

Figure 1:
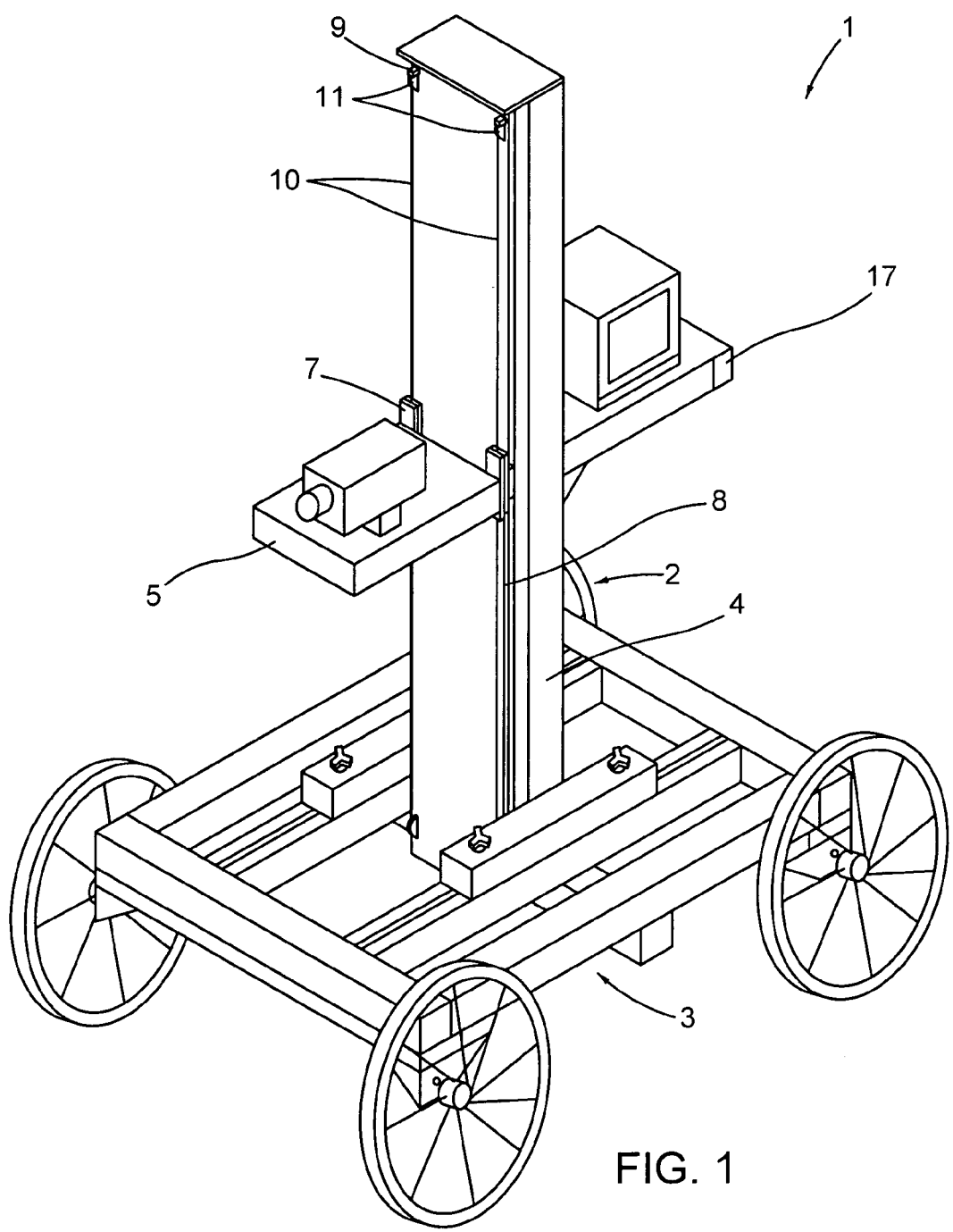
FIG. 1 shows an overall view of the camera dolly.

Referring now to the drawings in greater detail, FIG. 1 shows an overall view of the camera dolly 1. The dolly comprises the elevator 2 slidably mounted on the base 3.

Figure 2:
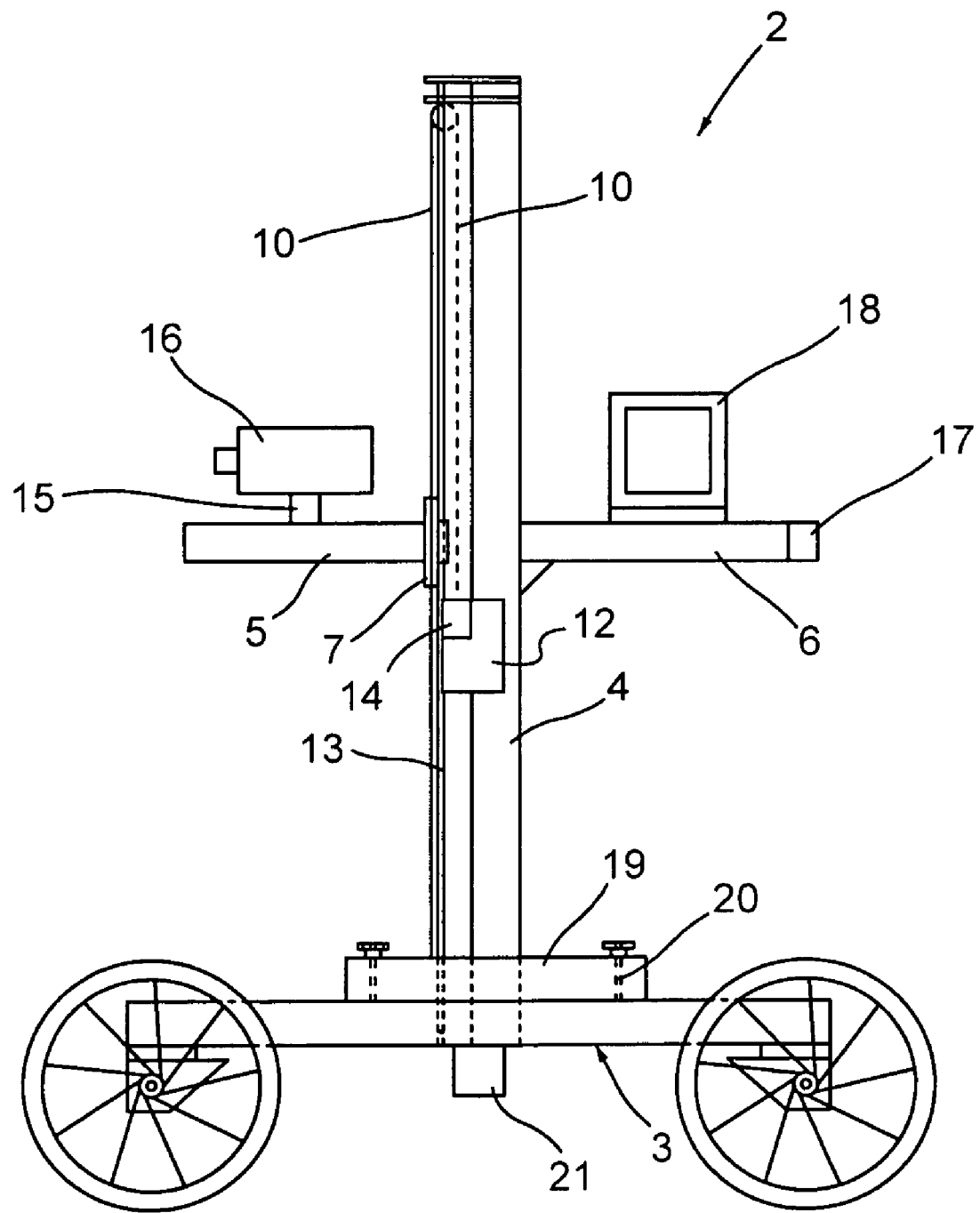
FIG. 2 shows a side view of the elevator.

In FIG. 2, the elevator 2 has a column 4 to which is connected a sliding shelf 5 and a fixed shelf 6. The sliding shelf 5 is connected to the elevator column 4 by bearing blocks 7 which slide on vertical rails 8. End stops 9 are provided at the top ends of the rails 8 to prevent the bearing blocks 7 from running off the end of the rails 8. The sliding shelf 5 if supported by cables 10 which are directed upward over pulleys 11 and down to a counterweight 12. The counterweight 12 is contained within the column 4 and may be either hanging free or mounted on rails 13 by bearing blocks 14 in the same manner as the sliding shelf 5. The sliding shelf 5 is provided with a camera mount 15, to which a camera 16 is mounted. The camera mount 15 may be a fixed, swiveling, tiltable or any other conventional type of camera mount. The counterweight 12 is adjustable to exactly match the weight of the camera 16 in order to provide smooth motion when the camera 16 is moved on the elevator. The fixed shelf 6 is fixedly mounted to the elevator column 4 on the side opposite the sliding shelf. If desired, the fixed shelf 6 may be adjustably mounted to the elevator column 4. A handle bar 17 for maneuvering the camera dolly 1 is connected to the fixed shelf 6. The fixed shelf 6 is typically used for a video monitor 18 and may also be used for any other items needed to operate the camera or dolly. Mounting blocks 19 are connected near the lower end of the column 4. The mounting blocks 19 are provided with holes 20 which are used to connect it to the base 3. A horizontal stabilizing bar 21 is connected to the lower end on the column 4.

Figure 3:
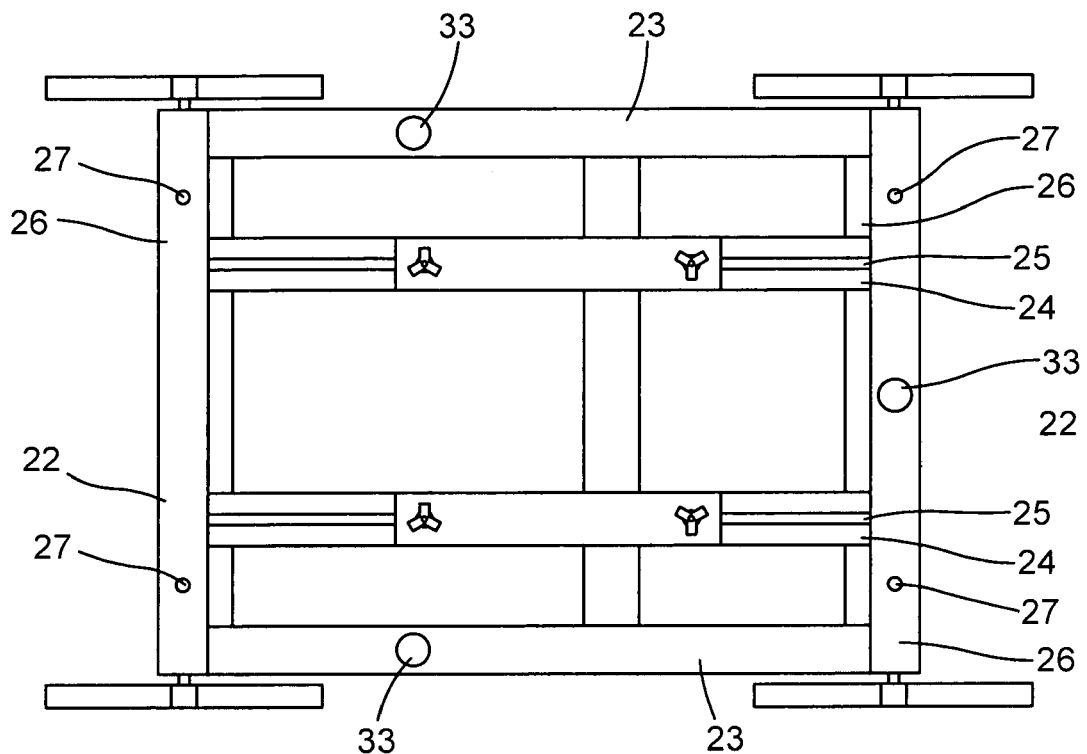
FIG. 3 shows a top view of the base.
Figure 4:
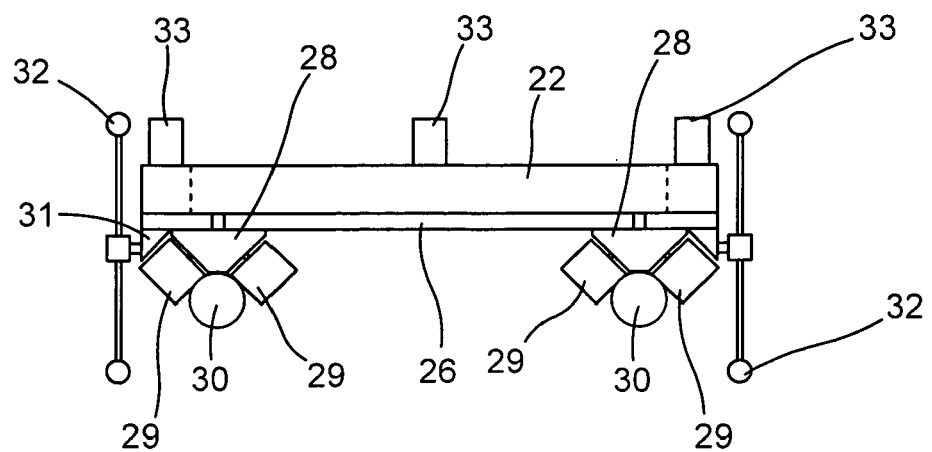
FIG. 4 shows a side view of the base.

In FIGS. 3 and 4, the base 3 comprises a frame formed of two end pieces 22 and two side pieces 23. Extending between the two end pieces 22 are two hollow beams 24. Each of the hollow beams 24 have a longitudinal slot 25. Two mounting plates 26 are connected to the bottom of the frame. The mounting plates 26 are provided with holes 27 to mounting brackets 28 which hold the rollers 29. The rollers engage tracks 30, typically made of rigid or semi-rigid PVC pipe. The tracks 30 may alternatively be made of one or more hoses filled with compressed air. The tracks 30 may be held in place by duct tape or any other suitable method. Wheel brackets 31 are mounted at each corner of the base 3. The wheels 32 are removably mounted to the brackets 31. The wheels 32 are removed when it is desired to use the camera dolly 1 on the tracks 30. Sockets 33 are located on one end piece 18 and the two side pieces 19 to provide mounting points for the feet of a tripod.

Figure 5:
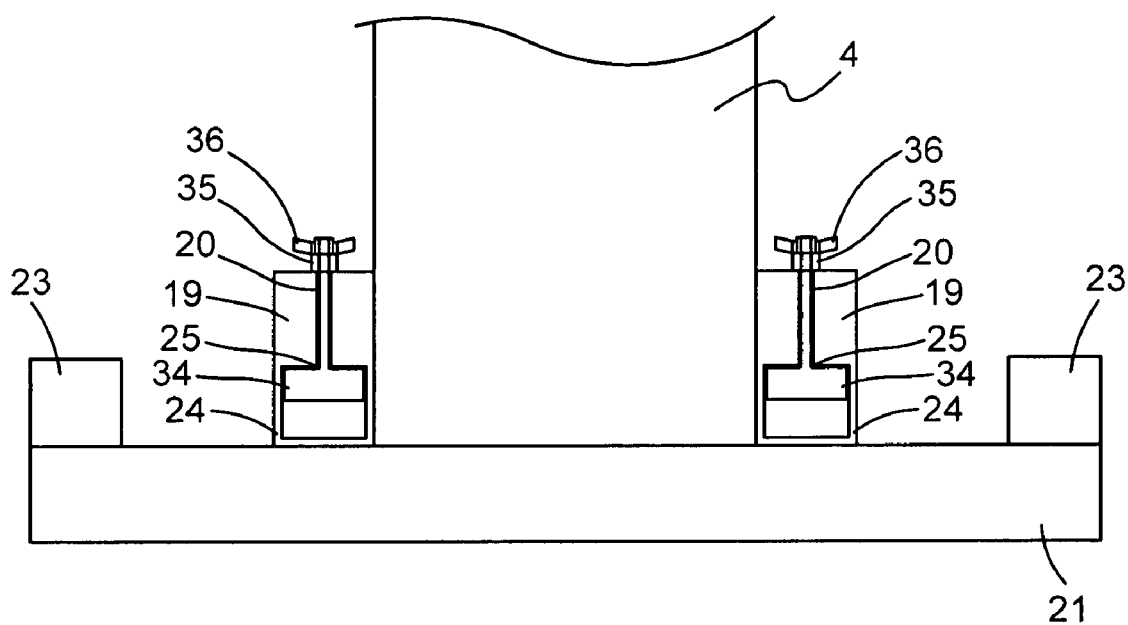
FIG. 5 shows the connection of the elevator to the base.

In FIG. 5, the column 2 is mounted to the base 4. The mounting blocks 19 are on top of the hollow beams 24. Bolts 34 are located in the interior of the hollow beams 24 so that they extend up through the longitudinal slot 25, through the holes 20 in the mounting blocks 19 and engage nuts 35. The nuts 35 are provided with projections 36 so that they may be tightened or loosened by hand in order to adjust the position of the elevator on the base.

Figure 6:
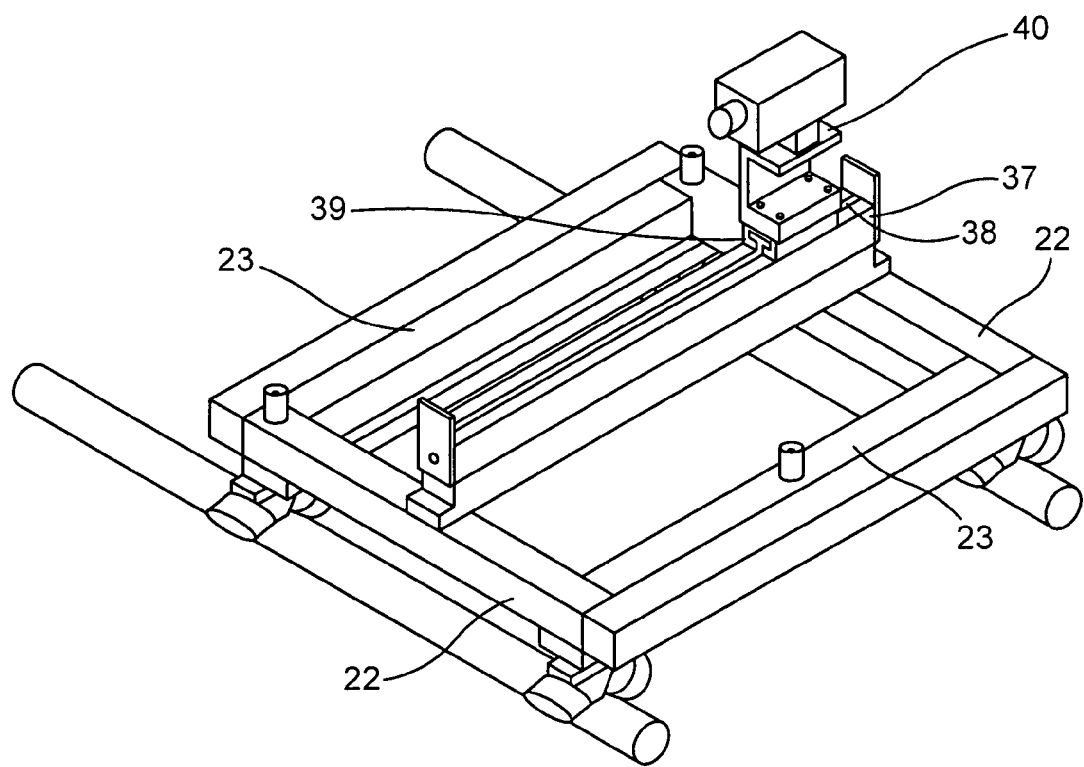
FIG. 6 shows a second embodiment of the base.

In FIG. 6, the base 3 holds a longitudinal beam 37 on top of end pieces 22. A rail 38 is mounted on top of the longitudinal beam 37. A bearing block 39 rides on the rail 38. Ball bearings provide for smooth movement between the bearing block 39 and the rail 38. A camera mount 40 to connected to the bearing block 39. Sockets 33 are located on one end piece 18 and the two side pieces 19 to provide mounting points for the feet of a tripod.

Figure 7:
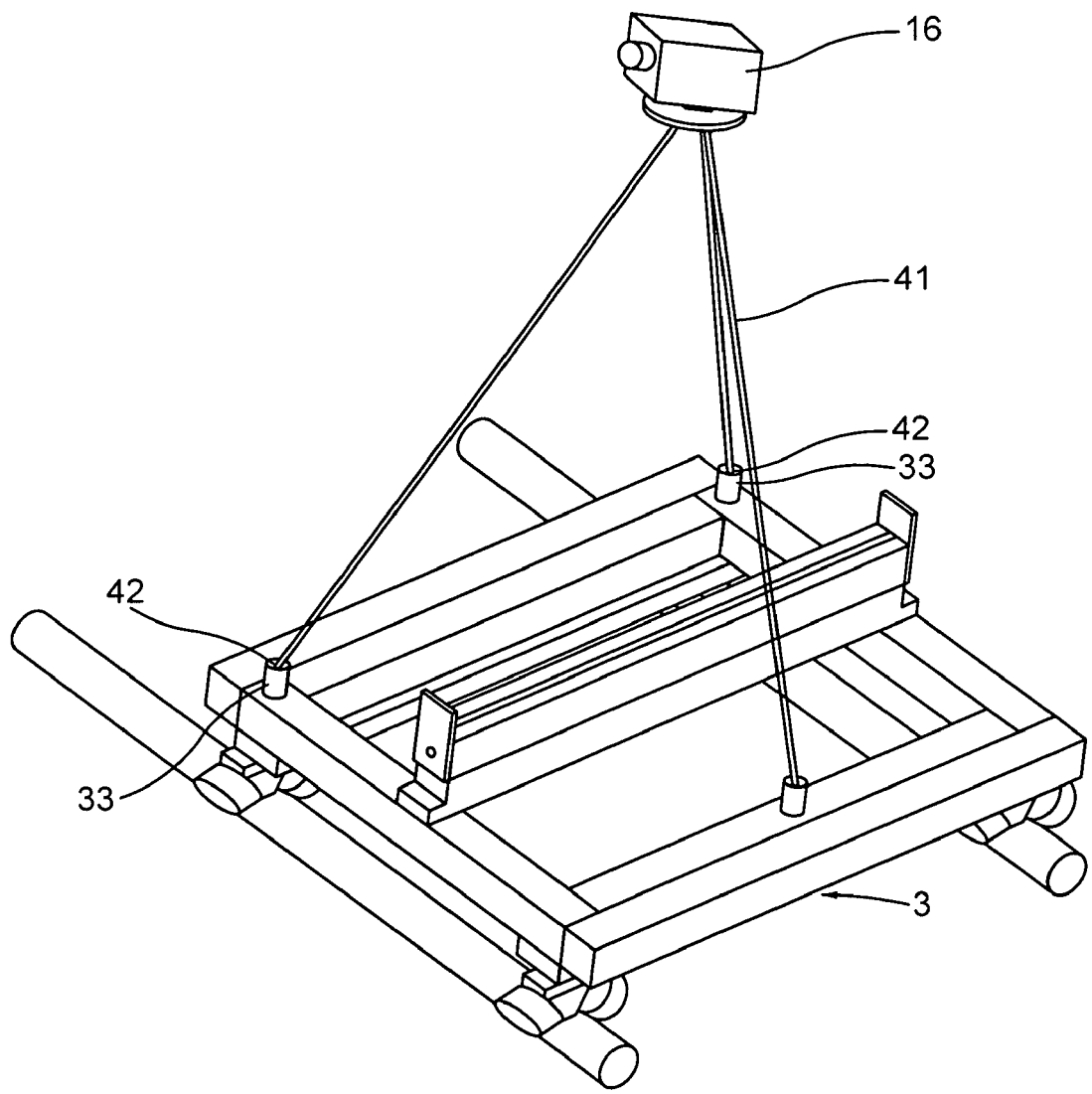
FIG. 7 shows a tripod mounted on the base.

In FIG. 7, a tripod 41 is mounted on the base 3 by inserting the feet 42 of the tripod into the sockets 33.

The component elements of the camera dolly are preferably made of aluminum and steel, but any suitable material made be used.

In use, a camera 16 is mounted to the sliding shelf 5 by the camera mount 15. The counterweight 12 is adjusted top the weight of the camera 16. If it is desired to use the camera dolly 1 on the tracks 30, the wheels 32 are removed from the base 3 and the rollers 29 are placed on the tracks 30. The camera dolly 1 is moved along the tracks 30, and the sliding shelf 5 is moved up and down as desired, to film a scene. If the tracks 30 are not going to be used, the wheels 32 and attached to the base 3. The camera dolly 1 is moved on the wheels 32, and the sliding shelf 5 is moved up and down as desired, to film a scene. The alternative embodiment is used similarly by mounting the camera 16 on the camera mount 40. The camera 16 is them moved along the rail 38 and the base ins moved on either the wheels 32 or track 30 in order to film a scene.

Figure 8:
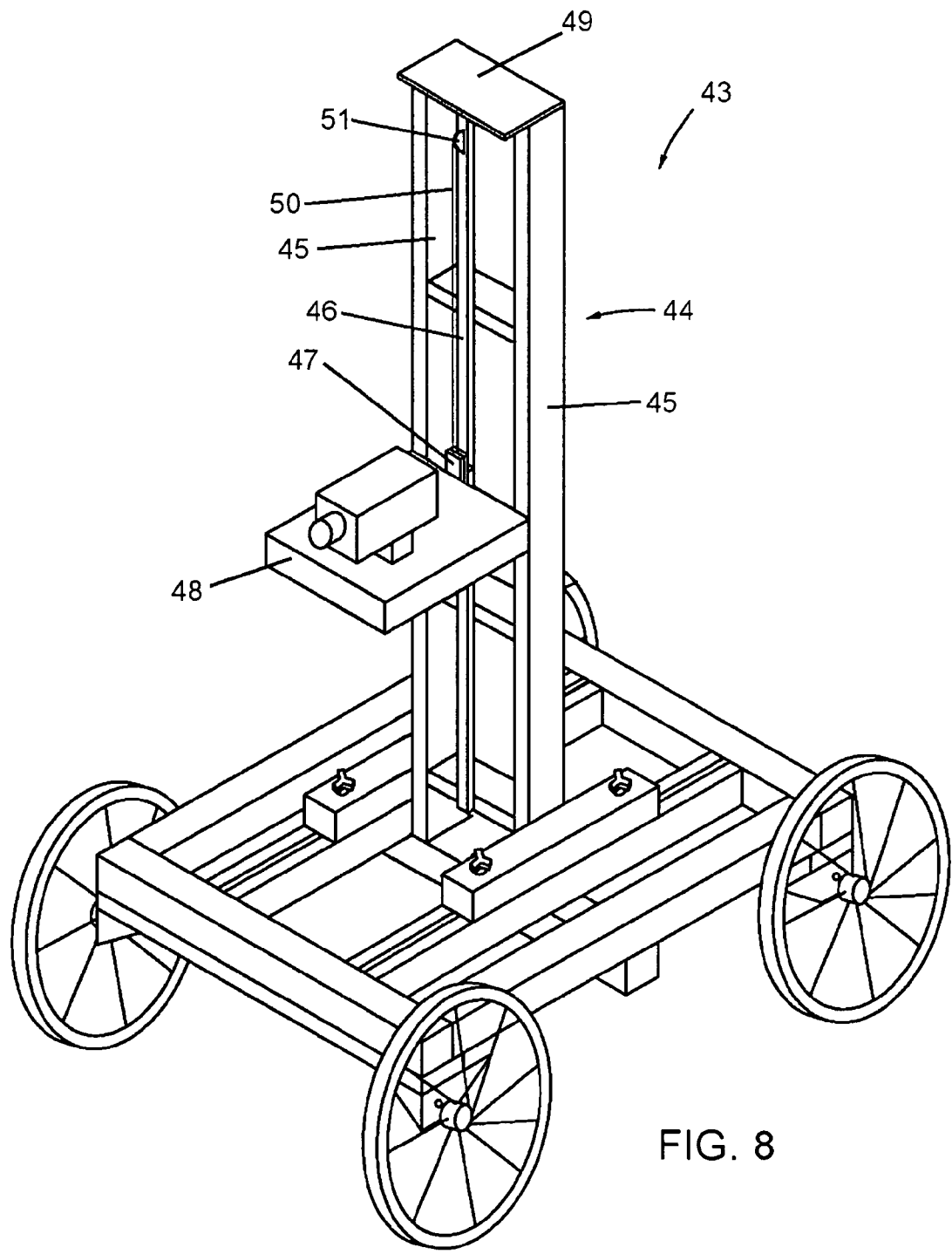
FIG. 8 shows an alternate embodiment of the camera dolly.

An alternative form of the camera dolly 43 is shown in FIG. 8. The elevator 44 is made of two upright columns 45 and a centrally positioned vertical rail 46. A bearing block 47 is slideably connected to the vertical rail 46. A sliding shelf 48 is connected to the bearing block 47 which slide on the vertical rail 46. A top piece 49 serves as a stop at the top end of the rail 46 to prevent the bearing block 47 from running off the end of the rail 46. The sliding shelf 48 is supported by a cable 50 which is directed upward over a pulley 51 and down to a counterweight (not shown). The counterweight is contained within the elevator and may be either hanging free or mounted on rails as in the other embodiments described herein Although the camera dolly and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

The invention claimed is:

1. A camera dolly comprising:
a base supported by four wheel assemblies,
a least one channel track mounted on said base,
at least one sliding member mounted in a sliding relationship on said channel track,
an adjustable fixing member arranged on said sliding member to selectively prevent said sliding member from moving relative to said channel track,
an upright member connected to said sliding member and a camera mount connected to said upright member.

2. The camera dolly as claimed in claim 1, wherein a first shelf is connected to said upright member by a moveable connection, and said camera mount is connected to said shelf.

3. The camera dolly as claimed in claim 2, wherein said moveable connection comprises:
at least one first vertical track mounted on said upright member,
at least one first vertical slider is moveable mounted to said first vertical track,
said first shelf is mounted to said first vertical slider,
at least one pulley is connected to the top of the said first vertical track,
at least one cable is connected to said first vertical slider at a first end,
a counterweight is connected to a second end of said cable,
said cable is routed through said pulley so that said pulley is between said first and second ends of said cable,
said counterweight being adjustable to balance the weight of a camera connected to said camera mount.

4. The camera dolly as claimed in claim 3, wherein said upright member has a second shelf mounted on the side opposite said first shelf, said second shelf being of sufficient size to hold a video monitor.

5. The camera dolly as claimed in claim 3, wherein said upright member has an interior space and said counterweight is arranged within said interior space.

6. The camera dolly as claimed in claim 5, wherein at least one second vertical track is arranged within said interior of said upright member,
said counterweight comprises a second vertical slider moveable mounted to said second vertical track and an adjustable mass connected to said second vertical slider.

7. A camera dolly comprising:
a base supported by four wheel assemblies,
a least one channel track mounted on said base,
at least one sliding member mounted in a sliding relationship on said channel track,
an adjustable fixing member arranged on said sliding member to selectively prevent said sliding member from moving relative to said channel track,
a camera mount connected to said sliding member,
three sockets equally spaced around the edge of said base, said sockets being sized to securely hold and support the legs of a camera tripod.

8. A camera dolly comprising:
a base supported by four wheel assemblies,
a least one channel track mounted on said base,
at least one sliding member mounted in a sliding relationship on said channel track,
an adjustable fixing member arranged on said sliding member to selectively prevent said sliding member from moving relative to said channel track,
a camera mount connected to said sliding member,
each of said wheel assemblies comprises a mounting bracket pivotally mounted to said base, two rollers connected to said mounting bracket, said rollers arranged to engage and ride upon a flexible track.

9. A camera dolly comprising:
a base supported by four wheel assemblies,
a least one channel track mounted on said base,
at least one sliding member mounted in a sliding relationship on said channel track,
an adjustable fixing member arranged on said sliding member to selectively prevent said sliding member from moving relative to said channel track,
an upright member having an interior space being connected to said sliding member,
at least one first vertical track being mounted on said upright member,
at least one pulley being connected to the top of the said first vertical track,
at least one first vertical slider being moveably mounted to said first vertical track,
a first shelf being mounted to said first vertical slider,
a camera mount being connected to said shelf,
at least one cable being connected to said first vertical slider at a first end,
a counterweight being connected to a second end of said cable,
said cable being routed through said pulley so that said pulley is between said first and second ends of said cable,
at least one second vertical track being mounted within said interior space of said upright member,
a second vertical slider moveable mounted to said second vertical track and an adjustable counterweight being connected to said second vertical slider,
said adjustable counterweight being adjustably sized to balance the weight of said first vertical slider, said first shelf, said camera mount, anything connected to said camera mount, and second vertical slider,
a second shelf being mounted to said upright member on the side opposite said first shelf, said second shelf being of sufficient size to hold a video monitor.

* * * * *